(12) United States Patent
Skoff

(10) Patent No.: US 10,946,805 B2
(45) Date of Patent: Mar. 16, 2021

(54) SURFBOARD RACK FOR VEHICLES

(76) Inventor: Shawn Skoff, Wilmington, NC (US)

( * ) Notice: Subject to any disclaimer, the term of this patent is extended or adjusted under 35 U.S.C. 154(b) by 535 days.

(21) Appl. No.: 12/106,264

(22) Filed: Apr. 18, 2008

(65) Prior Publication Data

US 2009/0261136 A1    Oct. 22, 2009

(51) Int. Cl.
- B60R 9/00 (2006.01)
- B60R 11/00 (2006.01)
- B60R 9/06 (2006.01)

(52) U.S. Cl.
CPC ................................ B60R 9/06 (2013.01)

(58) Field of Classification Search
USPC ............... 224/519, 525, 531, 533, 527, 535
See application file for complete search history.

(56) References Cited

U.S. PATENT DOCUMENTS

| | | | |
|---|---|---|---|
| 2,236,053 A * | 3/1941 | Caron | 280/47.26 |
| 4,059,209 A * | 11/1977 | Grisel | 294/147 |
| 5,330,084 A * | 7/1994 | Peters | 224/506 |
| 5,593,076 A * | 1/1997 | Biondo | 224/488 |
| 5,806,738 A * | 9/1998 | D'Angelo | 224/521 |
| 6,039,227 A * | 3/2000 | Stark | 224/521 |
| 6,554,171 B1 * | 4/2003 | Ewing, III | 224/521 |
| 7,097,408 B2 * | 8/2006 | Paxton | 414/462 |
| 7,240,816 B2 * | 7/2007 | Tsai | 224/501 |
| 2005/0205630 A1 * | 9/2005 | Cooper et al. | 224/521 |
| 2010/0213226 A1 * | 8/2010 | Gray | 224/400 |

* cited by examiner

Primary Examiner — Justin M Larson
Assistant Examiner — Lester L Vanterpool
(74) Attorney, Agent, or Firm — Thomas A. O'Rourke; Bodnar & O'Rourke, LLP

(57) ABSTRACT

A surfboard rack device has a center post, two bottom receiver rings, and two top retainer loops. The bottom receiver rings may also have flexible netting forming bottom baskets, into which one end of a surfboard is inserted. The other end of the surfboard rests in one of the top retainer loops and is secured by an elasticized strap that hooks to a strap ring on the top retainer loop or a pair of hinged rigid arcs which lock together. The device is mounted on a vehicle either by sliding a trailer hitch insert into the vehicle's trailer hitch receptacle, or by hooking the flat hooks of the rack support over the top and bottom of the vehicle's trunk lid.

7 Claims, 15 Drawing Sheets

SURFBOARD RACK FOR VEHICLES

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to racks or carriers for vehicles and particularly to a surfboard rack which holds a number of surfboards in a vertical position, the rack having a center post removably attached to a vehicle by a trailer hitch insert or bike type rack attached to the center post with the surfboards held in a pair of bottom receiver rings and a pair of upper retainer loops with rubberized cords or hinged padded arms which lock together, the rings attached to the center post.

2. Description of Related Art Including Information Disclosed Under 37 CFR 1.97 and 1.98

Surfboarding enthusiasts often travel to destinations where there is promise of favorable waves. Surfboards can be quite long and do not usually fit entirely within a vehicle, so that a portion of the surfboard would extend out of a window in the vehicle, which is dangerous. The surfboards, which are often wet with salt water must be mounted securely preferably on the outside of a vehicle. Mounting the surfboards so that they do not create a sail effect from the wind produced by the speed of the vehicle and do not provide an obstruction to the driver presents problems. The prior art surfboard mounts do not adequately solve the problems.

Surfboard racks which are mounted on the top of a vehicle are known in prior art, however it is not always easy to load or unload a surfboard using these racks and the wind from the speed of the vehicle can get under the surfboards if they are mounted flat on the roof and tend to lift the boards. Examples of these racks can be found in U.S. Pat. No. 5,884,824 and in FIG. 9 of U.S. Pat. No. 6,685,070.

A front mounted hitch receiver has also been proposed in U.S. Pat. No. 6,457,734, which states that it may be used with surfboard holders. However this arrangement can be a visual distraction while driving.

U.S. Patent Application #20040124608, published Jul. 1, 2004 by McCoy, is for a utilitarian accessory mounting system for a trailer hitch assembly. The apparatus allows one to mount a utilitarian accessory on a pair of mounting arms on a receiver assembly. The apparatus includes a utilitarian accessory and a mounting assembly including a pair of posts that are connected to that accessory. The posts include mounting sections that when engaged with the accessory mounting arms on the receiver assembly define an included angle of between 1-45.degree., 5-45.degree. or 10-45.degree. with a horizontal plane. The utilitarian accessory may take the form of any imaginable useful article that might be connected to a receiver assembly. While not being considered limiting, the list of utilitarian accessories could include, for example, a cargo basket, box, container or platform, a tradesman's workbench, a table, a bicycle, scooter or motorcycle carrying rack, a snow board, surfboard or ski rack, an equipment platform with or without equipment (e.g. winch), a utility lighting system, a dump bed or the like.

U.S. Patent Application #20040226974, published Nov. 18, 2004 by Anton, provides a motor vehicle integrated carrier rack system. Generally, the system includes a receiving unit, having rear and forward ends, integrated into a rear wall, such as a rear section of a trunk lid, a tailgate of a pickup truck, or a rear door of a van, a side wall, such as a side of a truck bed, a side door, or a side of a trunk lid, or a front wall, such as a front of a bus, a front of a truck, or a front of a motor home. The receiving unit may be positioned such that the rear end is directed toward the outside of the vehicle and forms an engaging structure in the rear, side, or front wall. The system further includes an immobilizing system attached to the receiving unit, a carrier bar engaged to the receiving unit, and various attachment units. The integrated carrier rack system is user friendly and may be applied to any motor vehicle to carry an assortment of items such as bicycles, snow skis, surfboards, and luggage and may include a variety of attachments to better lock the carried items.

U.S. Patent Application #20050092800, published May 5, 2005 by Wilson, shows a removable rack system for carrying elongated cargo such as surfboards or canoes on vehicles such as RVs, which have a tall, substantially vertical surface such as the back end of the vehicle. A rack is mounted to the bumper and includes vertical and horizontal rails for positioning support bars that hold the cargo in place, and a tray is mounted to the receiver hitch or to bars extending from the bumper brackets, to support the weight of the cargo. No damage or alteration of the vehicle is required, and no special tools are required. The tray may include a receiver for daisy-chaining a second hitch for towing a trailer.

U.S. Patent Application #20050205630, published Sep. 22, 2005 by Cooper, claims a surf and ski transport which comprises a hitch-mountable, vehicle load carrying apparatus and method. The device includes a base load-carrying platform, and a vertical support structure connected to a horizontal crossbar structure that is adjustable in height. The device further includes several transverse bars that are also adjustable for secure fitting to the equipment that is to be transported. An exemplary embodiment includes wheels connected to the load-carrying platform for convenient stowage of equipment without physical removal from the device.

U.S. Patent Application #20060006302, published Jan. 12, 2006 by Gragg, concerns an apparatus to support at least one compressed gas cylinder for assisting with safely assembling SCUBA Gear. With one or more receptacles, circular in shape, that are slightly larger in diameter than the SCUBA cylinders that they are meant to accommodate and are just deep enough to provide vertical support to the cylinder, preventing cylinder from falling over, a horizontal support onto which receptacles would be permanently mounted that would provide a substructure on which the bottom of the cylinder(s) would rest, a vertical support bar permanently attached to and descending from horizontal support bar, having a plurality of holes to accommodate height adjustment, and a second horizontal bar, inserted into existing vehicle trailer receiver at one end with a collar on the opposite end to receive the vertical support bar with a set of holes to set a pin through to support vertical bar at different heights.

U.S. Pat. No. 7,153,062, issued Dec. 26, 2006 to Baumgartner, is for a vertically adjustable support device for scuba tanks, which attaches to the rear of a vehicle via a hitch receiver to allow the device to be raised or lowered to a convenient usage height for the diver. One implementation includes a vertical support tube that provides a rigid structural support for other components of the scuba tank holder apparatus to be joined to, a slideably joined holder carriage, and a hitch receiving member; in which a first end portion of the hitch receiving member is joined to a lower portion of the vertical support tube, and a second end portion is configured to be operable for being securely joined to a vehicle hitch, thereby structurally supporting the vertical support tube and associated components when joined thereto.

U.S. Pat. No. 6,039,227, issued Mar. 21, 2000 to Stark, provides a golf bag transportation apparatus for carrying golf bags external to a motor vehicle equipped with a standard square tube trailer hitch receptacle permanently mounted to the frame and under the rear bumper of said vehicle. The golf bag carrier consists of a substantially rectangular pan assembly upon which the golf bag is vertically placed; a trailer hitch shank which is telescopically received by the standard square tube trailer hitch receptacle mounted to the motor vehicle, said shank being affixed to the bottom of said rectangular pan assembly; a second standard square tube trailer hitch receptacle affixed to the bottom of the rectangular pan assembly and coaxial with its trailer hitch shank, a vertical member detachably attached to the rectangular pan; and a horizontal member detachably attached to the top end of the vertical member and having a plurality of horizontal support arms for stabilizing the golf bag being transported. The vertical member and horizontal member can be disassembled and loosely placed in the rectangular pan of the golf bag carrier for compact storage of the apparatus. The golf bag carrier can be used alone or as part of a system of accessories suitable for adapting the golf bag carrier to a variety of configurations, for use with other devices. Other devices having a trailer hitch shank, such as a second golf bag carrier or a bicycle carrier, can be attached to the golf bag carrier by means of its trailer hitch receptacle, thus permitting multiple devices to be utilized simultaneously for transportation purposes.

U.S. Pat. No. 6,554,171, issued Apr. 29, 2003 to Ewing III, shows a golf bag rack which is removably attachable to a vehicle through a hitch receiver and can support multiple golf bags thereon. The rack includes a tongue which can pass directly into a hitch receiver on the vehicle or through an intervening adapter. A mast extends up from the tongue. A cross bar extends horizontally from an upper end of the mast. The mast and cross bar are configured to support an upper portion of golf bags which are carried upon the rack. The cross bar preferably can be extended or collapsed as necessary to provide support for a varying number of golf bags upon the rack. A beam is pivotably attached to the mast adjacent the tongue. The beam pivots between two orientations including a substantially horizontal orientation and a substantially vertical orientation. A central platform is supported upon the beam. Two side platforms are slidably supported relative to the beam. When the side platforms are slid away from the central platform each of the side platforms and the central platform can support a separate golf bag, so that three golf bags can be supported upon the rack. When the side platforms are adjacent a central platform one or two golf bags can be supported upon the platforms in a balanced fashion relative to a center line of the rack.

U.S. Pat No. D437,578, issued Feb. 13, 2001 to Stannard-Warne, claims the ornamental design for a golf bag carrier for a vehicle.

U.S. Pat. No. 5,806,738, issued Sep. 15, 1998 to D'Angelo, discloses a vehicle hitch securable carrying apparatus for golf bags and the like. The carrying apparatus has a rearwardly projecting hitch engaging portion and is capable of supporting an elongate article such as a golf bag containing a plurality of golf clubs. A substantially horizontally disposed and planar shaped base supports a lower end of the elongate article and includes an upwardly projecting edge extending around a perimeter of the base. An elongate support is secured at a lower end to the base and extends upwardly therefrom so as to terminate at an upper end. A cross member is secured at a location proximate the upper end of the elongate support and includes a first laterally extending support portion and a second opposite and laterally extending support portion for engaging an upper end of the supported elongate article. A hitch receiving portion extends from the elongate support and includes an inserting end which is engaged by the vehicle hitch engaging portion so that the carrying apparatus is mounted in a suspended and rearwardly extending manner from the vehicle. A locking pin inserting through overlapping apertures formed in the hitch engaging portion and hitch receiving portion and preventing disengagement of the carrying apparatus from the hitch engaging portion.

U.S. Pat. No. 7,090,104, issued Aug. 15, 2006 to Dorety, puts forth a vehicle hitch support for tables and other accessories. A combination table and support member assembly is provided for use in connection with a trailer hitch mounted onto a vehicle, where the support member and table can be joined in various configurations to vary the table height when in use and to vary the lateral separation distance between the rear of the vehicle and the table and vertical components of the support member when in use or in transport to allow for sufficient distance to enable utilization of the tailgate, rear door or hatchback of the vehicle. Extension members may also be utilized to alter the configuration. While the invention primarily involves a table or other horizontal support surface, the accessory may comprise a grill, bicycle rack, fishing pole rack, surfboard rack, canoe support, flag pole mount, motorcycle rack, etc.

U.S. Pat. No. 6,752,302, issued Jun. 22, 2004 to Anton, concerns an integrated carrier rack system for motor vehicles. Generally, the system includes a receiving unit, having rear and forward ends, integrated into a rear wall, such as a rear section of a trunk lid, a tailgate of a pickup truck, or a rear door of a van, a side wall, such as a side of a truck bed, a side door, or a side of a trunk lid, or a front wall, such as a front of a bus, a front of a truck, or a front of a motor home. The receiving unit may be positioned such that the rear end is directed toward the outside of the vehicle and forms an engaging structure in the rear, side, or front wall. The system further includes an immobilizing system attached to the receiving unit, a carrier bar engaged to the receiving unit, and various attachment units. The integrated carrier rack system is user friendly and may be applied to any motor vehicle to carry an assortment of items such as bicycles, skis, snowboards, surfboards, wave boards, scooters, and luggage.

Two U.S. Patents, Pat No. 5,680,976 issued Oct. 28, 1997 and Pat No. 5,879,102 issued Mar. 9, 1999 to Koliopoulos, illustrate a multi-functional cargo and accessory carrier for attachment to a vehicle receiver hitch. The device includes a riser assembly secured to the vehicle, a door assembly pivotally secured to the riser assembly, and a platform assembly pivotally secured to the door assembly for carrying cargo at a desirable elevation above ground level, such that the door assembly can be pivotally rotated in a horizontal plane and a parallel plane while secured to the riser assembly. The platform assembly can be rotated about the door assembly and maintained in a vertical or horizontal position relative to ground, whether or not it carries a load or it is installed on the vehicle. The carrier provides a multipurpose support assembly which can be used as a "stand alone" unit to carry cargo, and which can be used in combination with other accessory carriers such as a cargo chest, bicycle carrier, ski carrier or any number of other accessory-carrying devices. It provides access to the vehicle rear compartment door without removal of the cargo or the carrier itself from the vehicle, regardless of the position of the platform assembly. It adds flexibility and it may be adapted to any type of vehicle configuration. It does not require attachment to the bumper or bumper mounting brackets, vehicle frame, or vehicle body, and can be adapted to any size receiver hitch configuration. It can be resized by merely changing the lengths of the riser beam, door beam and platform assembly tubes. All the side plate connecting tubes can be tapped in the ends of their internal diameter to accept the thread of a ⅝ inch bolt, for attaching a number of accessory mounts, such as accessory mounts for bike racks, ski racks, gas cans, carrying cages, cargo chests, carrying trays, fishing poles, snow boards, surf boards, wheel chairs, tool chests, mobile cook tops, ovens, ice chests, and lawn mowers, to name a few.

U.S. Pat. No. D409,557, issued May 11, 1999 to Armour, is for the ornamental design for a motorcycle hitch golf club rack.

What is needed is a surfboard mounting rack for a vehicle which enables easy installation of the surfboards on the rack and which securely holds the surfboards during movement of the vehicle minimizing the wind effect of travel and minimizing the obstruction of the view of the driver of the vehicle.

BRIEF SUMMARY OF THE INVENTION

An object of the present invention is to provide a surfboard mounting rack for a vehicle removably mounted securely to a back of the vehicle with a pair of bottom padded receiving rings into which the surfboards are inserted instantly and upper curved retaining rings against which the surfboards are rested instantly with an elasticized strap to secure the surfboards in the retaining ring or a pair of hinged arcs which lock together, wherein the rings are mounted on two sides of a vertical center post having means to removably attach the surfboards to the back of the vehicle with the surfboards mounted vertically or angled forward with the edges of the surfboards facing forward which enables easy installation of the surfboards on the rack and which securely holds the surfboards during movement of the vehicle minimizing the wind effect of travel and minimizing the obstruction of the view of the driver of the vehicle.

Another object of the present invention is to provide a bottom trailer hitch insert rigidly attached to the center post and extending orthogonally therefrom at a bottom of the center post for inserting the bottom trailer hitch insert into a trailer hitch on a vehicle for transporting the device attached to the vehicle.

An alternate object of the present invention is to provide a support frame rigidly attached to the center post, the support frame comprising a pair of upper hooks and a pair of lower hooks for attaching to parts of the vehicle for removably securing the device to the vehicle, wherein the hooks are thin flat metal hooks which removably hook under a top edge and a bottom edge of the vehicles trunk lid.

In brief, a vehicle attached surfboard rack holds a number of surfboards in a vertical position, the rack having a center post removably attached to the vehicle by either a trailer hitch insert or bike type rack attached to the center post with the surfboards held in a pair of bottom receiver rings and a pair of upper retainer loops with rubberized cords, the rings attached to the center post. In one embodiment, a bottom rigid horizontal extension of the center post is inserted in a trailer hitch receptacle of the vehicle. In another embodiment, a bicycle type rack attaches to the center post and to the vehicle. The pair of bottom padded receiver rings, one on each side of the center post near the bottom, may each have a basket-shaped net extending downwardly therefrom for receiving an end of a surfboard. The padded rings being affixed near the bottom of a first side and a second side of the vertical portion of the L-shaped post; two padded loops for securing an upper portion of an upright surfboard, one affixed to each side of the vertical portion of the L-shaped post near the top of said vertical portion; a rubberized strap or bungee cord attached to each padded loop for securing an upright surfboard.

An advantage of the present invention is that it is easily, quickly, and removably mounted to a vehicle.

Another advantage of the present invention is that it provides a quick and easy way to secure surfboards to a vehicle for transporting.

Still another advantage of the present invention is that the surfboards may be locked to the surfboard carrying rack.

One more advantage of the present invention is that it has resilient padded surfaces on which the surfboards rest, thereby minimizing scratching of the surfboards.

An additional advantage of the present invention is that it may be constructed either as a trailer hitch insert or as a traditional bike rack-type mount.

A further advantage of the present invention is that it minimizes wind interference to the surfboards while the vehicle is in motion.

A contributory advantage of the present invention is that it minimizes visual obstruction for the driver of the vehicle when the surfboards are mounted on the device.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
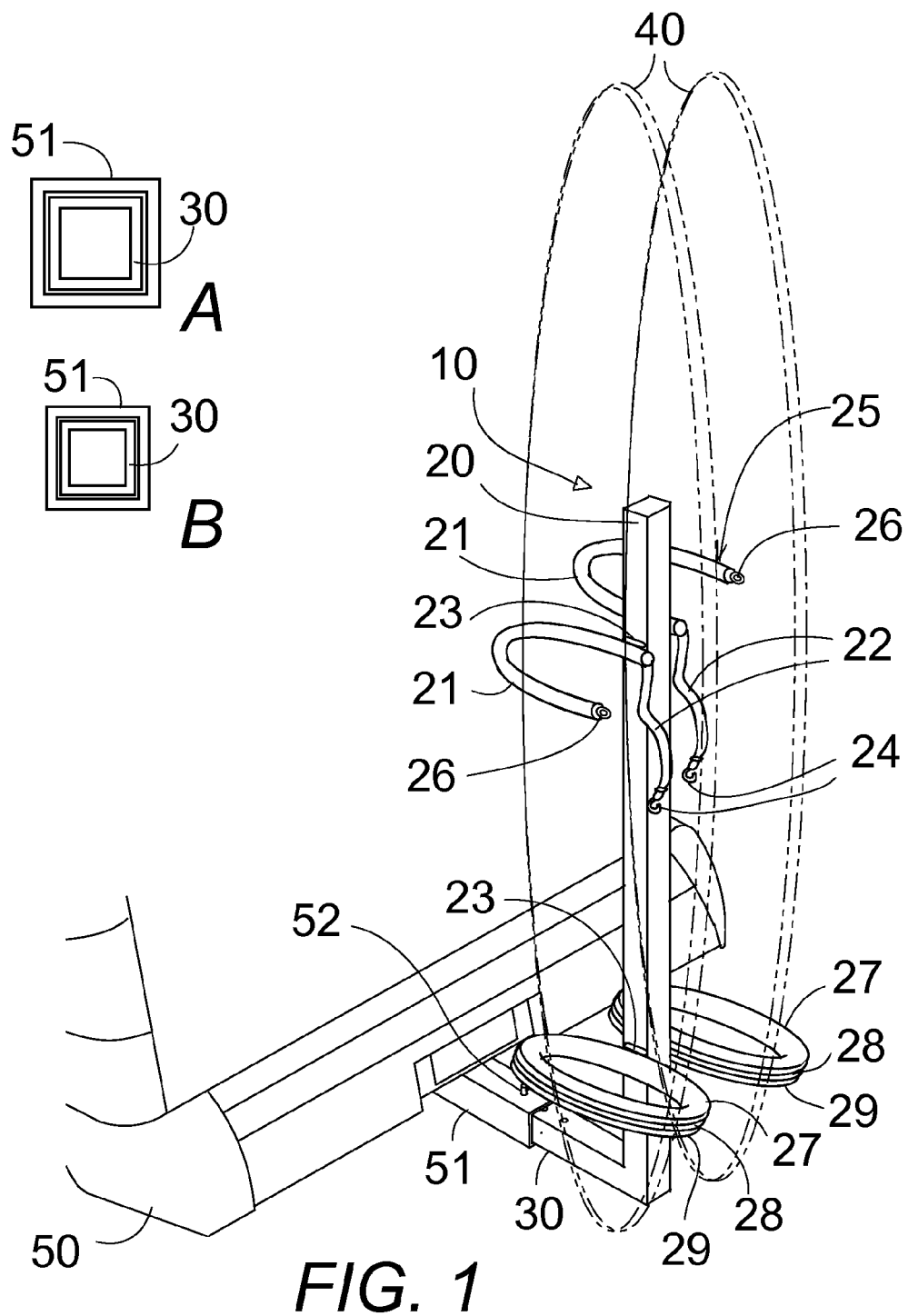
FIG. 1 is a perspective view of the surfboard carrier device of the present invention having a trailer hitch insert on a center post attached to a trailer hitch receptacle of a vehicle and a pair of surfboards with each one resting in a bottom receiving ring attached to each side of the center post and an upper portion of the board resting in a retainer loop attached to each side of the top of the center post with an elasticized strap for retaining the board therein, wherein A and B show two different sizes of trailer hitch inserts for two different sizes of trailer hitch receptacles.
Figure 2:
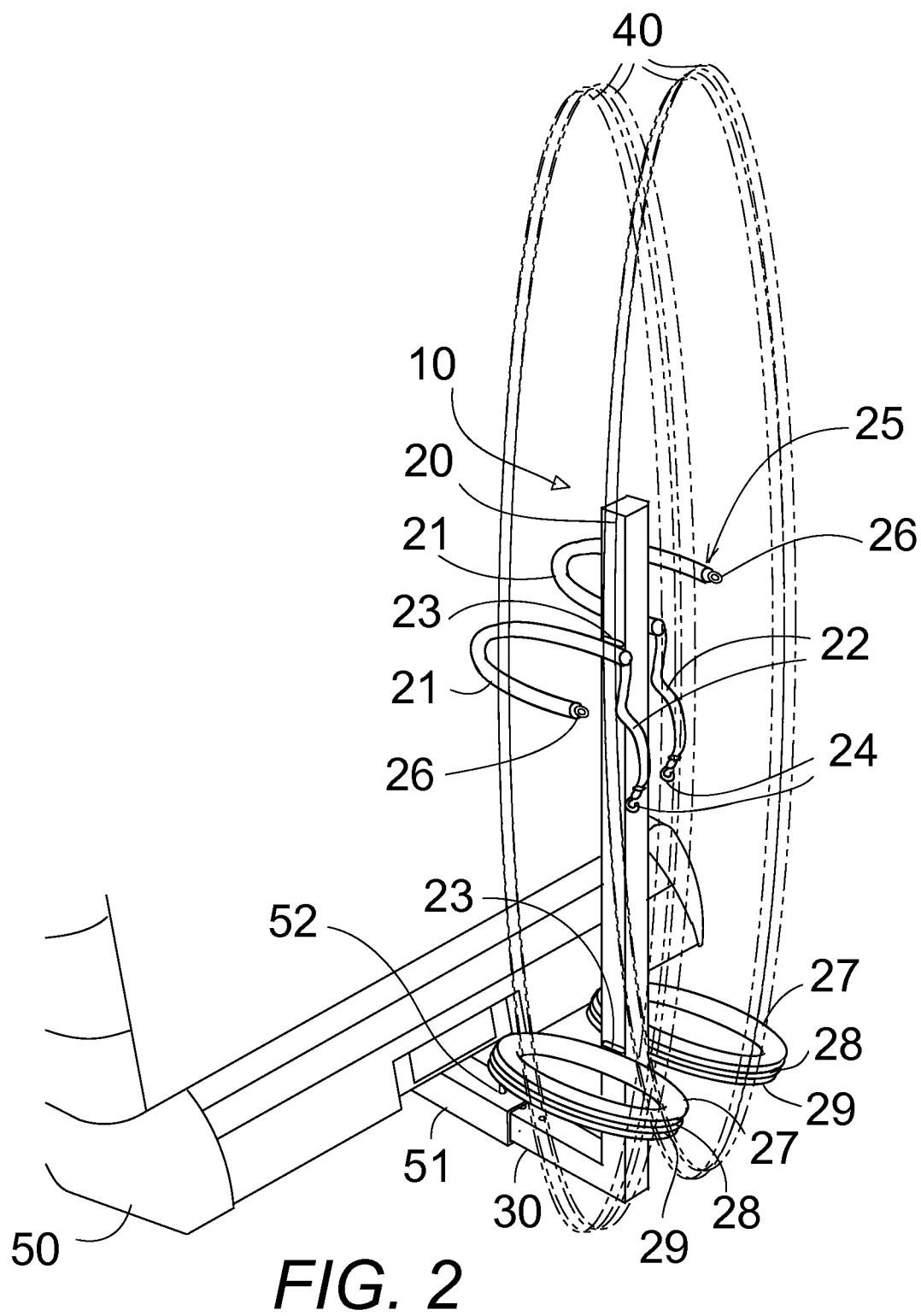
FIG. 2 is a perspective view of the surfboard carrier device of FIG. 1 having four surfboards with two boards resting in a bottom receiving ring attached to each side of the center post and an upper portion of two boards resting in a retainer loop attached to each side of the top of the center post with an elasticized strap for retaining the boards therein.
Figure 3:
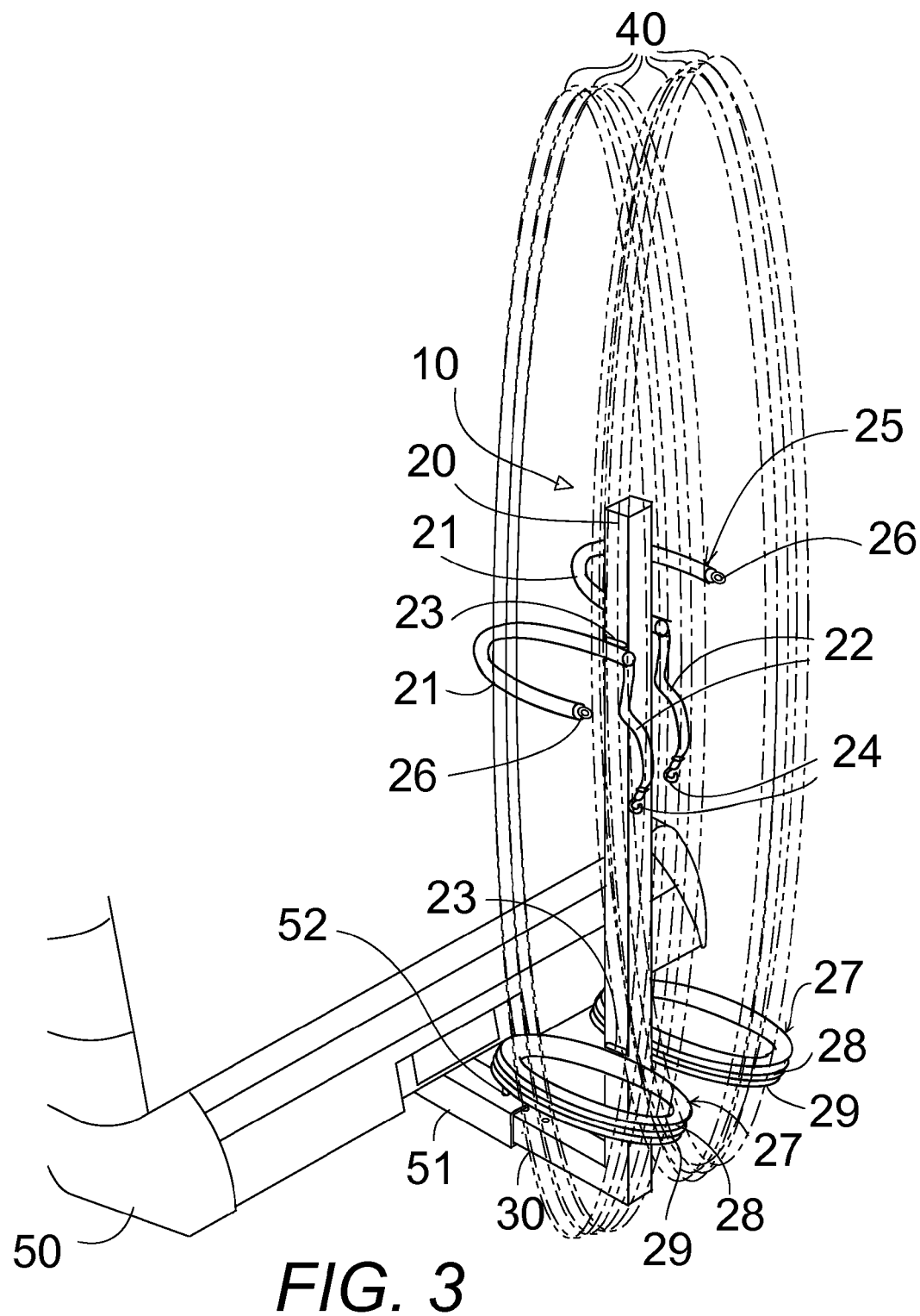
FIG. 3 is a perspective view of the surfboard carrier device of FIG. 1 having six surfboards with three boards resting in a bottom receiving ring attached to each side of the center post and an upper portion of three boards resting in a retainer loop attached to each side of the top of the center post with an elasticized strap for retaining the boards therein.
Figure 4:
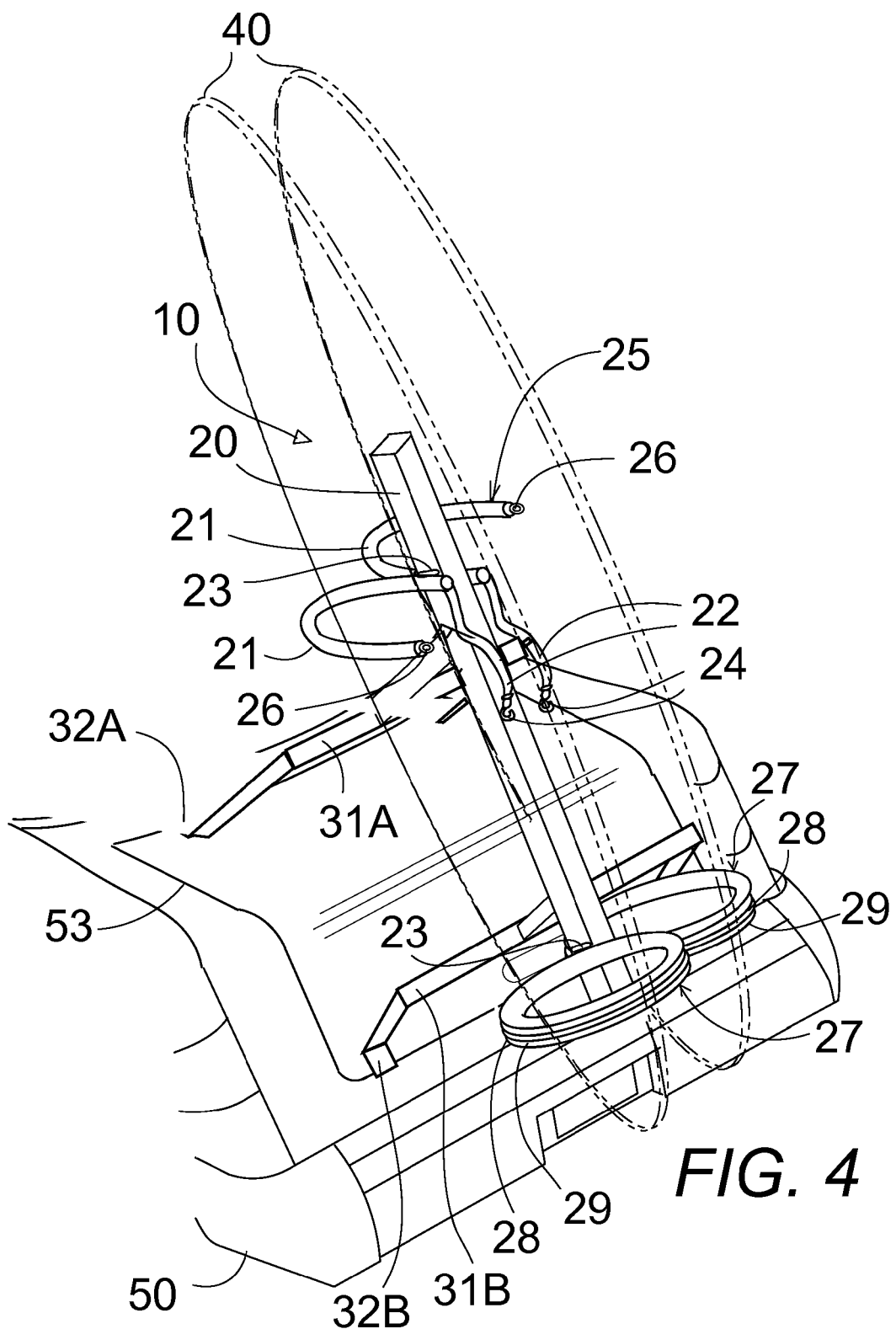
FIG. 4 is a perspective view of the surfboard carrier device of the present invention having a center post with an attached rack support with flat hooks attached under a top and bottom of a trunk lid of a vehicle and a pair of surfboards with each one resting in a bottom receiving ring attached to each side of the center post and an upper portion of the board resting in a retainer loop attached to each side of the top of the center post with an elasticized strap for retaining the board therein.
Figure 5:
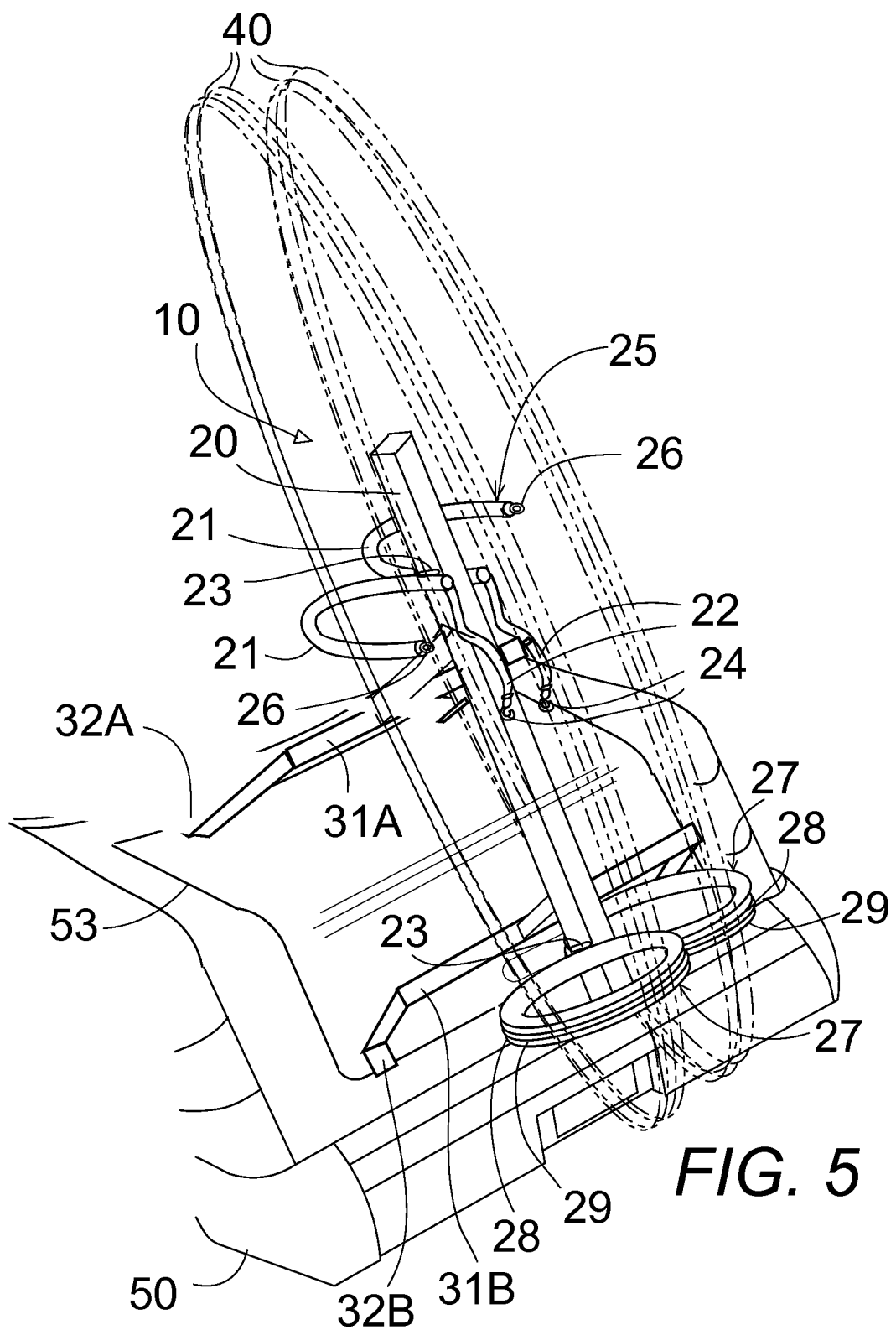
FIG. 5 is a perspective view of the surfboard carrier device of FIG. 4 having four surfboards with two boards resting in a bottom receiving ring attached to each side of the center post and an upper portion of two boards resting in a retainer loop attached to each side of the top of the center post with an elasticized strap for retaining the boards therein.
Figure 6:
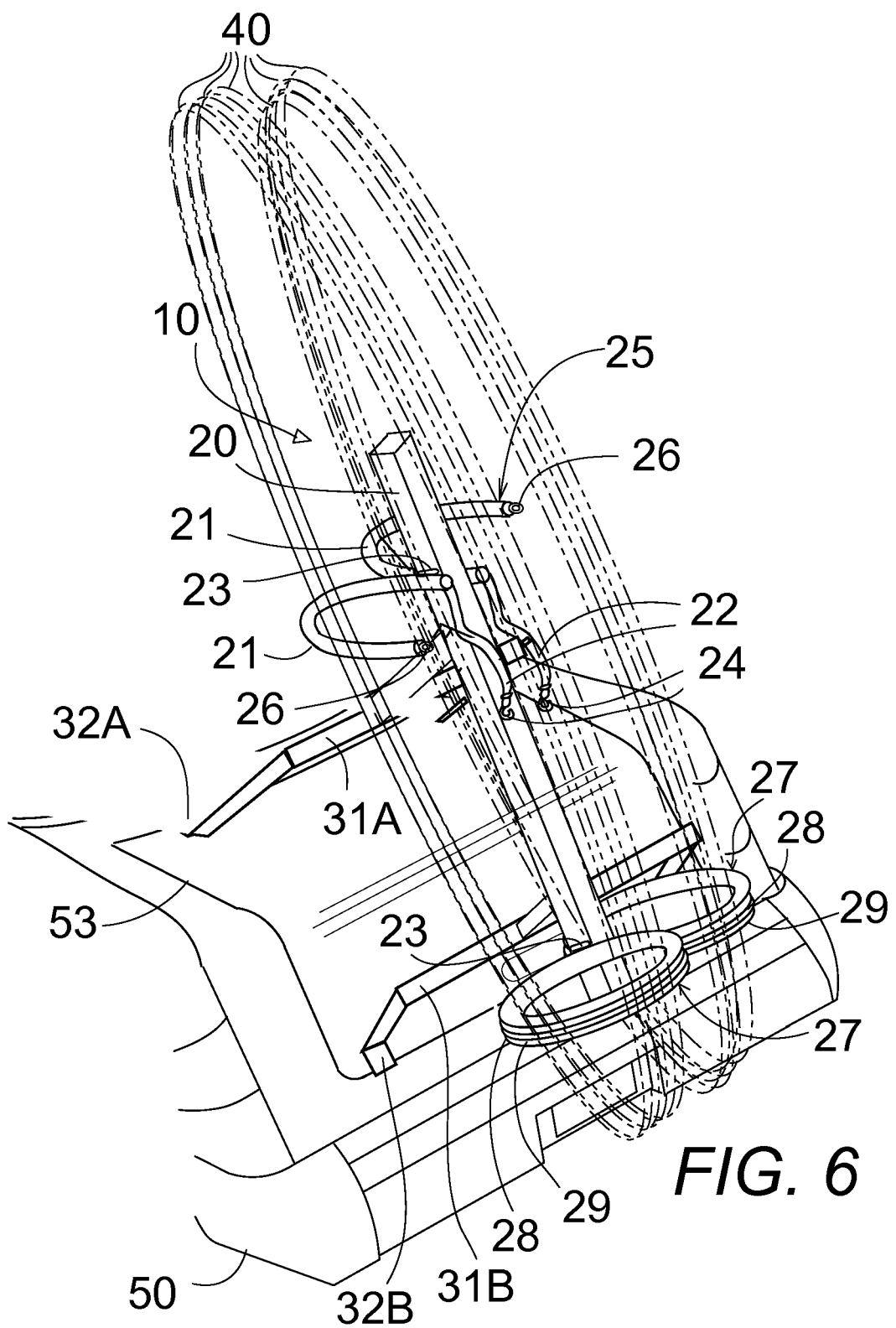
FIG. 6 is a perspective view of the surfboard carrier device of FIG. 4 having six surfboards with three boards resting in a bottom receiving ring attached to each side of the center post and an upper portion of three boards resting in a retainer loop attached to each side of the top of the center post with an elasticized strap for retaining the boards therein.
Figure 7:
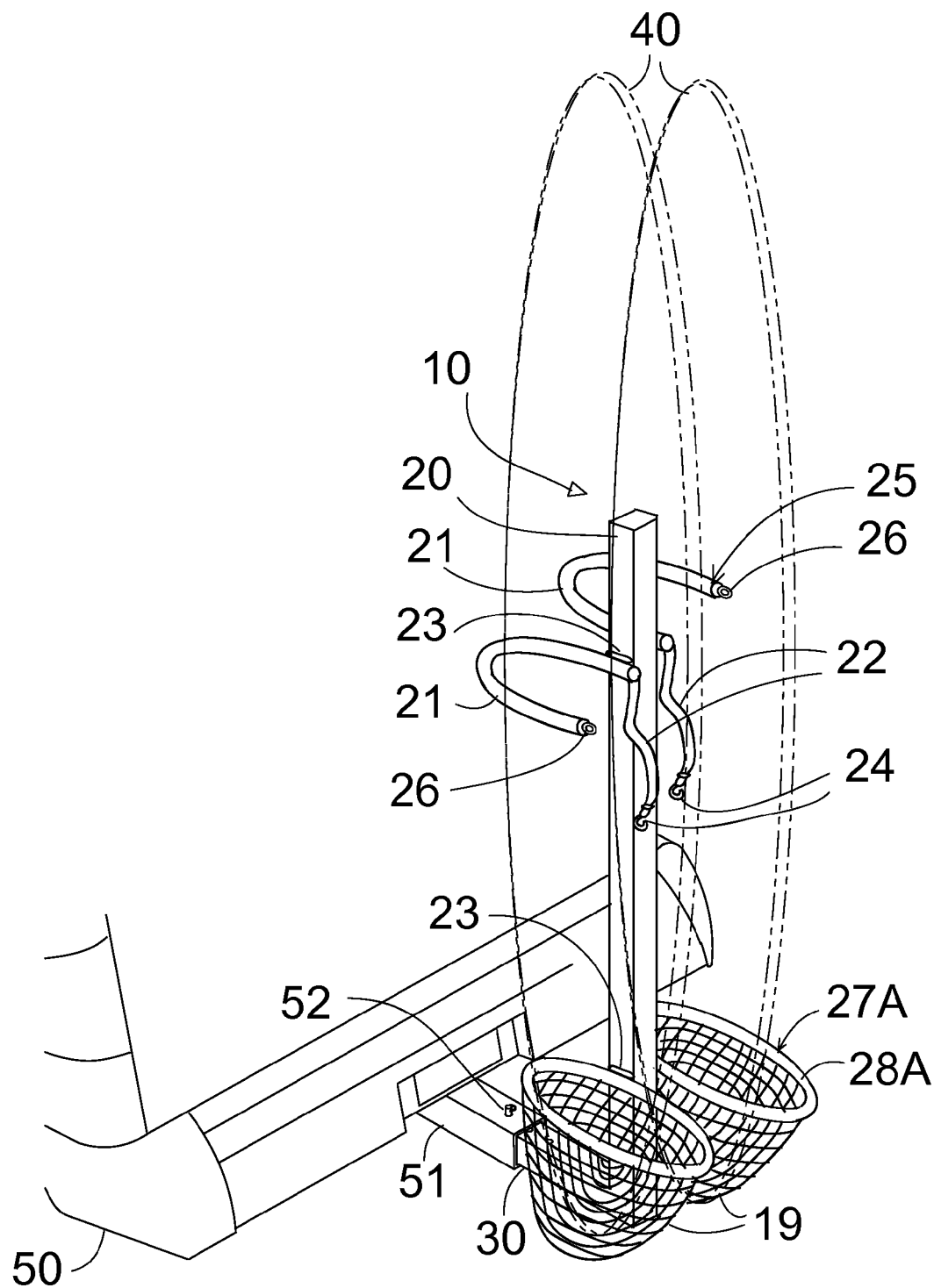
FIG. 7 is a perspective view of the surfboard carrier device of the present invention having a trailer hitch insert on a center post attached to a trailer hitch receptacle of a vehicle and a pair of surfboards with each one resting in a bottom receiving ring with a bottom mesh net basket attached to each side of the center post and an upper portion of the board resting in a retainer loop attached to each side of the top of the center post with an elasticized strap for retaining the board therein.
Figure 8:
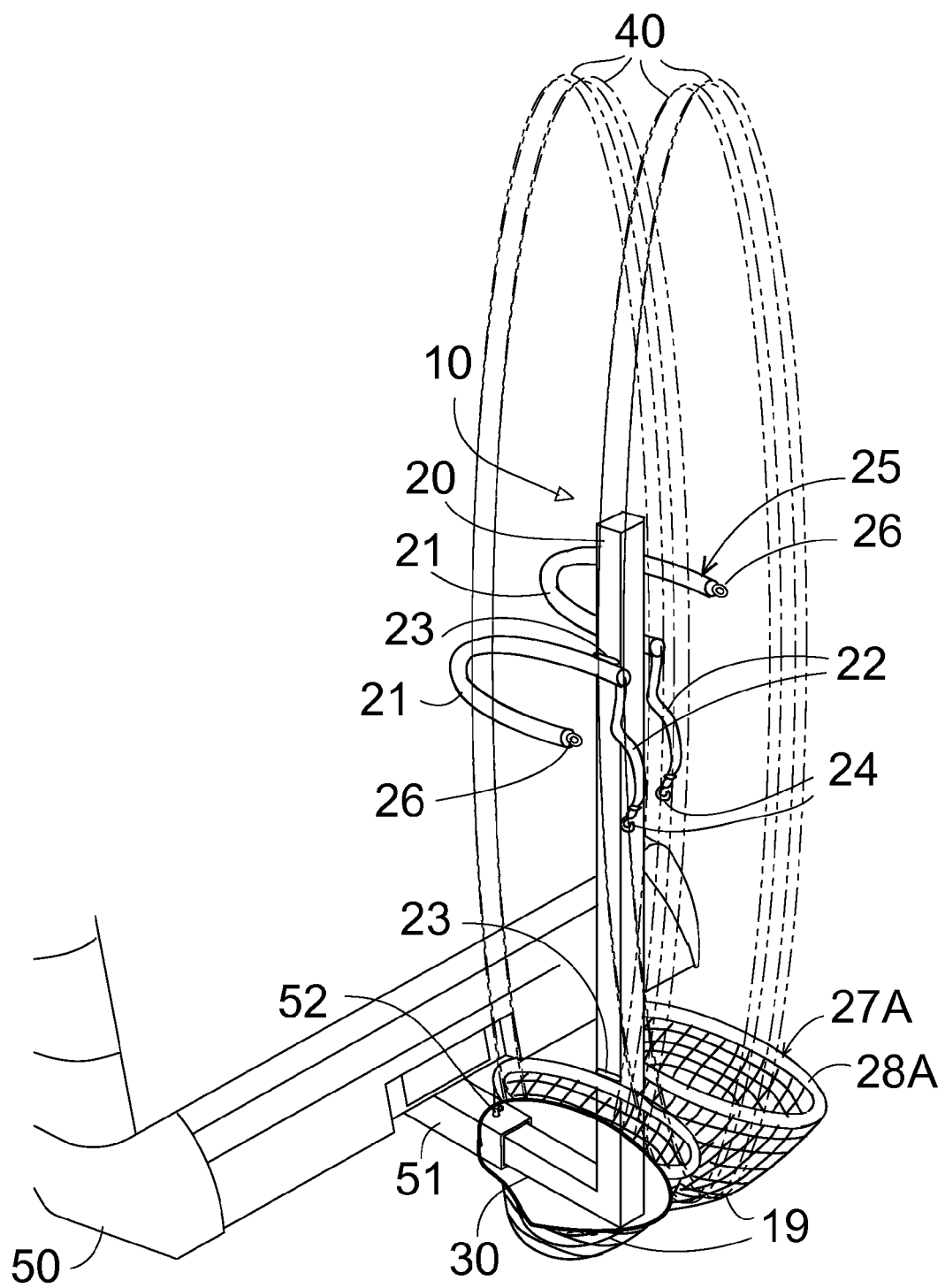
FIG. 8 is a perspective view of the surfboard carrier device of FIG. 7 having four surfboards with two boards resting in a bottom receiving ring with a bottom mesh net basket attached to each side of the center post and an upper portion of two boards resting in a retainer loop attached to each side of the top of the center post with an elasticized strap for retaining the boards therein.
Figure 9:
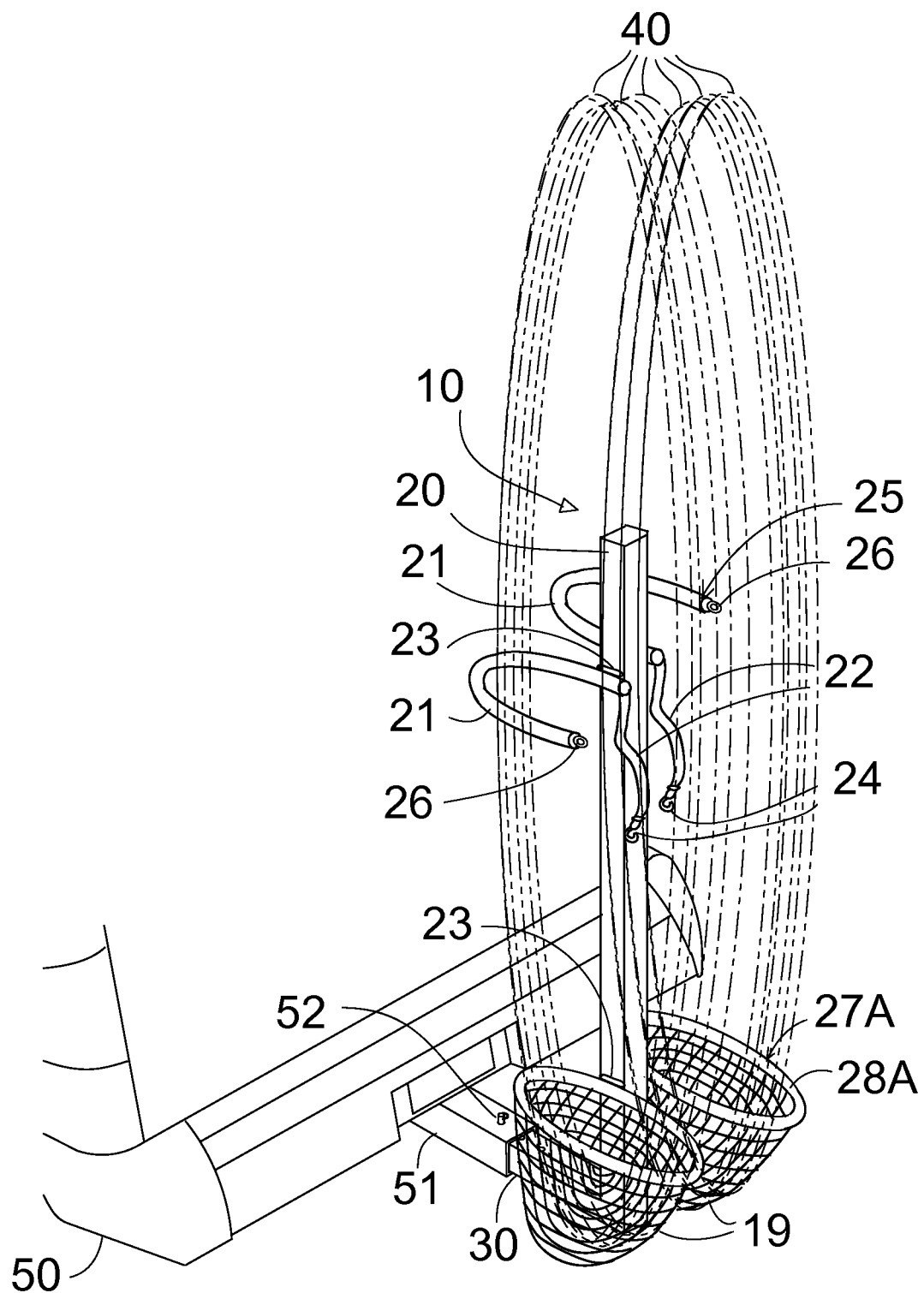
FIG. 9 is a perspective view of the surfboard carrier device of FIG. 7 having six surfboards with three boards resting in a bottom receiving ring with a bottom mesh net basket attached to each side of the center post and an upper portion of three boards resting in a retainer loop attached to each side of the top of the center post with an elasticized strap for retaining the boards therein.
Figure 10:
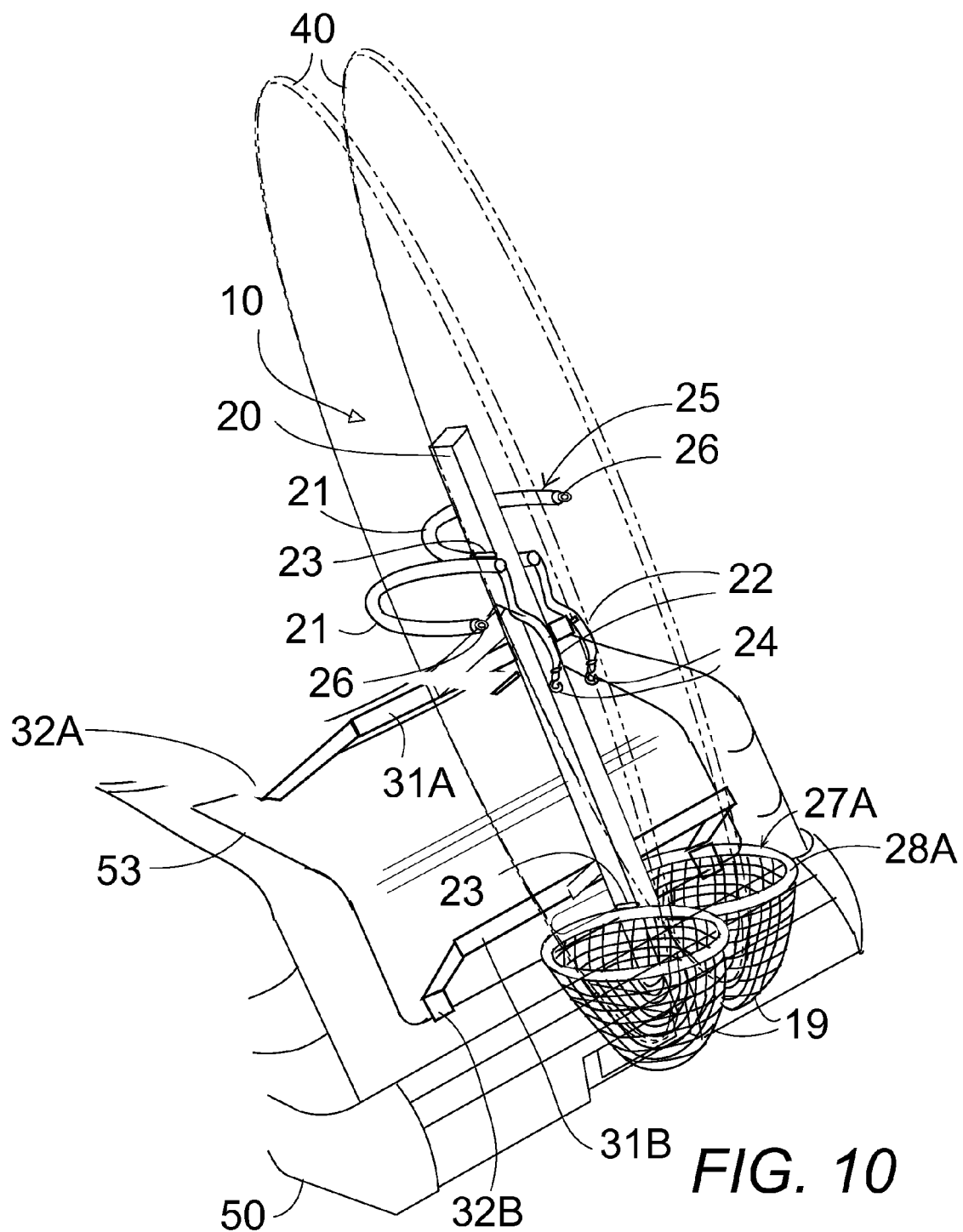
FIG. 10 is a perspective view of the surfboard carrier device of the present invention having a center post with an attached rack support with flat hooks attached under a top and bottom of a trunk lid of a vehicle and a pair of surfboards with each one resting in a bottom receiving ring with a bottom mesh net basket attached to each side of the center post and an upper portion of the board resting in a retainer loop attached to each side of the top of the center post with an elasticized strap for retaining the board therein.
Figure 11:
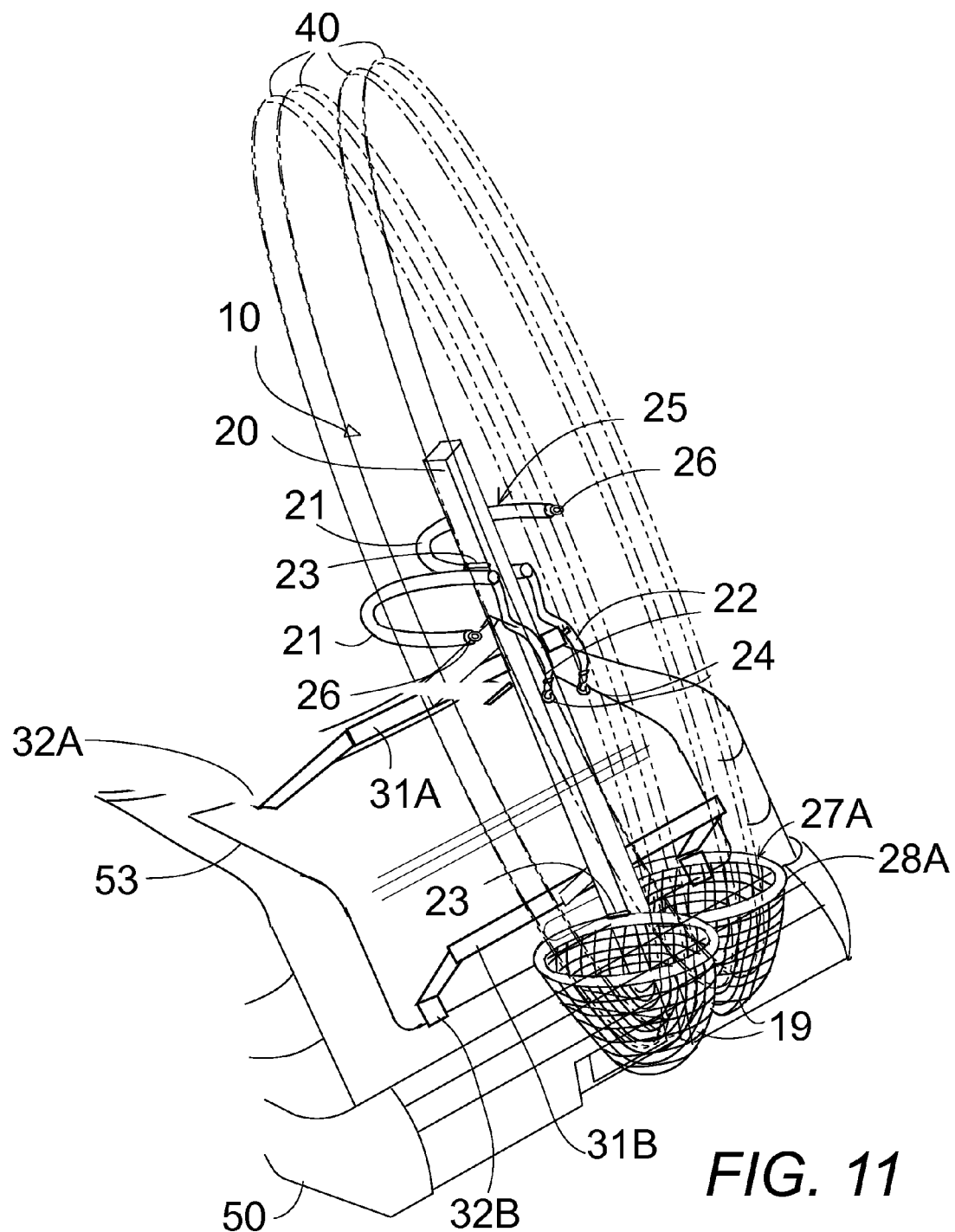
FIG. 11 is a perspective view of the surfboard carrier device of FIG. 10 having four surfboards with two boards resting in a bottom receiving ring with a bottom mesh net basket attached to each side of the center post and an upper portion of two boards resting in a retainer loop attached to each side of the top of the center post with an elasticized strap for retaining the boards therein.
Figure 12:
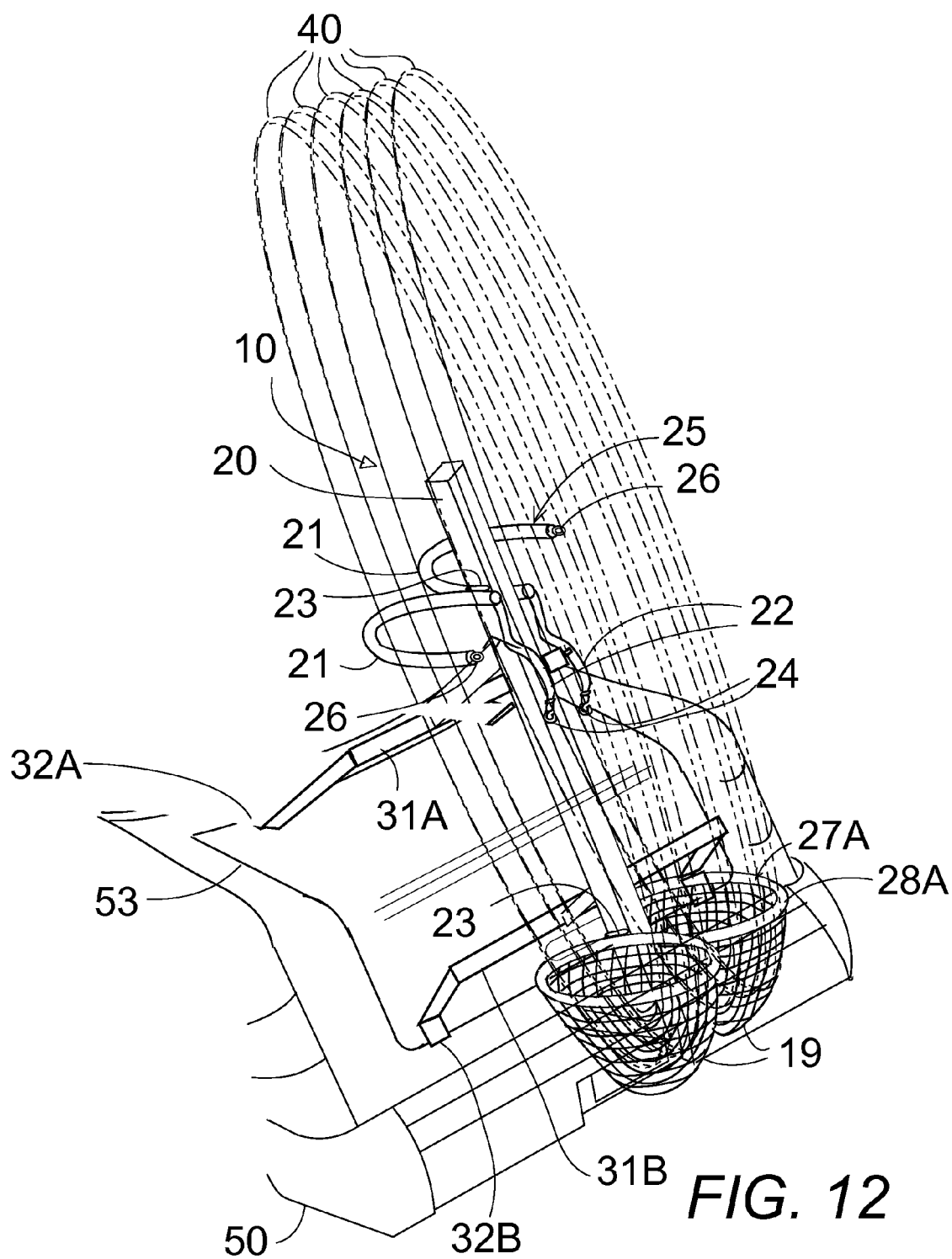
FIG. 12 is a perspective view of the surfboard carrier device of FIG. 10 having six surfboards with three boards resting in a bottom receiving ring with a bottom mesh net basket attached to each side of the center post and an upper portion of three boards resting in a retainer loop attached to each side of the top of the center post with an elasticized strap for retaining the boards therein.

In FIGS. 1-14, a surfboard carrier device 10 for vehicles comprises a center post 20, a pair of bottom receiver rings 27, a pair of top retainer loops 25, and a pair of elasticized straps 22, and means for mounting the device removably to a vehicle 50.

The center post 20, which is removably attachable to a vehicle, comprises a rigid elongated post for supporting a plurality of surfboards 40 attached thereto and means for attaching the post removably to a vehicle 50 for transporting at least one surfboard 40 attached to the center post. In one embodiment, as shown in FIGS. 1-3 and 7-9, the center post 20 has a bottom trailer hitch insert 30, rigidly attached to the center post 20, and extending orthogonally from the bottom of the center post 20 for removably inserting into a vehicle trailer hitch receiver 51 with locking pin 52, for transporting the surfboard carrier device 10 and surfboards 40 attached to a vehicle 50. In FIG. 1, A and B show two different sizes of trailer hitch inserts 30 for two different sizes of trailer hitch receptacles 51.

FIGS. 4-6 and 10-12 show a second embodiment, wherein the center post 20 is rigidly attached to an upper frame support 31A, and a lower support frame 31B. In this embodiment, the upper support frame 31A has two upper vehicle attaching hooks 32A, and the lower support frame 31B has two lower vehicle attaching hooks 32B. The vehicle attaching hooks 32A and 32B, preferably thin flat metal hooks, removably hook under a top edge and a bottom edge of the vehicle trunk lid 53 or other parts of the vehicle 50.

In FIGS. 1-6, a pair of bottom receiver rings 27 is attached to a bottom portion of the center post 20 by weld connections 23, with one of the pair on each of two sides of the center post 20. Each the bottom receiver rings 27 comprises a rigid surfboard encircling structure 28, covered by a resilient surface covering 29, to support a bottom portion of at least one surfboard 40 placed within each of the bottom receiver rings 27.

Figure 14:
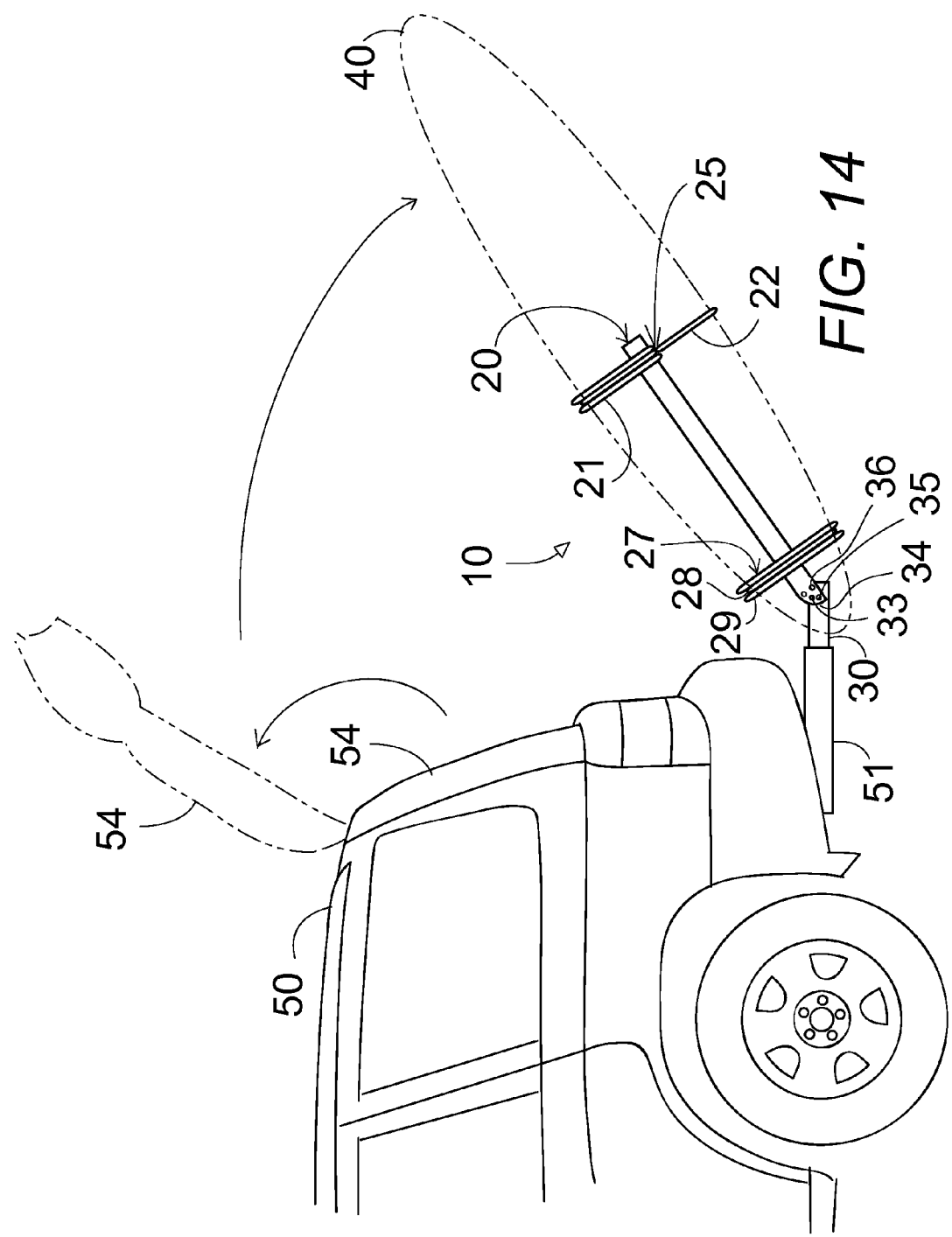
FIG. 14 is a side elevational view of the surfboard carrier device of FIG. 13 showing the center post pivoted down away from the back of the vehicle to allow a back door of the vehicle to swing open.
Figure 15:
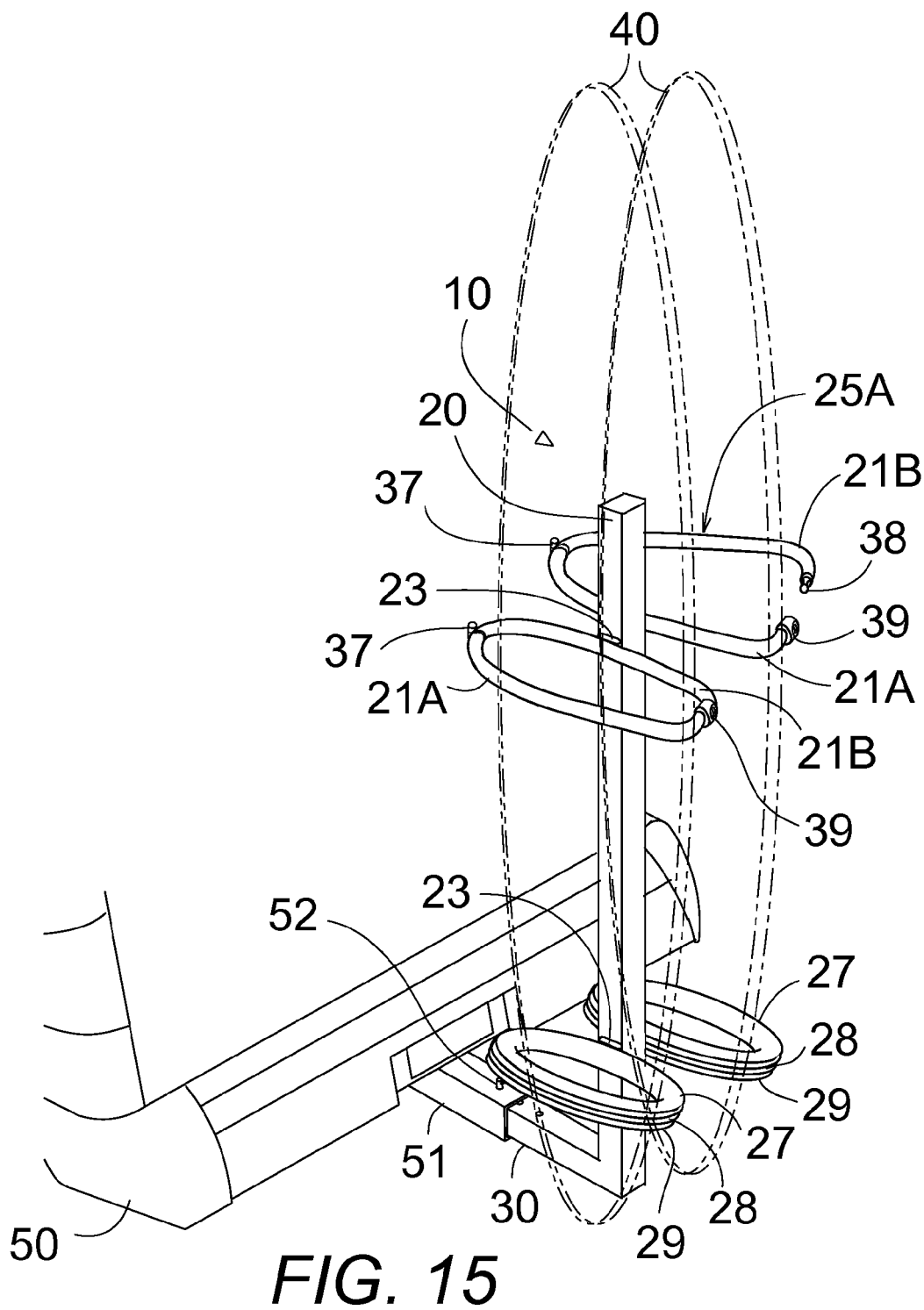
FIG. 15 is a perspective view of the surfboard carrier device of the present invention having a trailer hitch insert on a center post attached to a trailer hitch receptacle of a vehicle and a pair of surfboards with each one resting in a bottom receiving ring attached to each side of the center post and an upper portion of the board resting in a retainer loop attached to each side of the top of the center post with a pair of hinged padded arms which lock together to secure the surfboards to the center post.

A pair of top retainer loops 25 in FIGS. 1-14 and 25A in FIG. 15, attached to an upper portion of the center post 20 by weld connections 23, with one of the pair of top retainer loops 25 and 25A on each of the two sides of the center post 20 above and spaced apart from the pair of bottom receiver rings 27. Each of the retainer loops comprises adjustable means for admitting and securing at least one surfboard within the retainer loop.

In FIGS. 1-14, each of the retainer loops 25 comprises a rigid arc portion 21 covered by a resilient surface covering to receive at least one surfboard resting against the arc portion and an elasticized strap 22 attached around the at least one surfboard connecting two sides of the arc portion by a hook 24 and loop 26 for retaining the at least one surfboard secured thereto for transport of the at least one surfboard.

In FIG. 15, each of the retainer loops 25A comprises a pair of pivotable arc portions 21A and 21B covered by a resilient surface cover, the pair of pivotable arc portions attached together at first end by a hinge 37 to allow pivoting therebetween and a removably securing lock 39 on one arc 21A which receives at a second lock insertion end 38 to alternate lock and release at least one surfboard 40 between the pair of pivotable arc portions 21A and 21B.

In another embodiment, as shown in FIGS. 7-12, the bottom receiver ring 27A with a rigid padded encircling structure 28A further comprises a flexible netting forming a bottom basket 19 attached around the bottom of each of the bottom receiver rings 27A for receiving the bottom of at least one surfboard 40 resting in the bottom basket 19.

Figure 13:
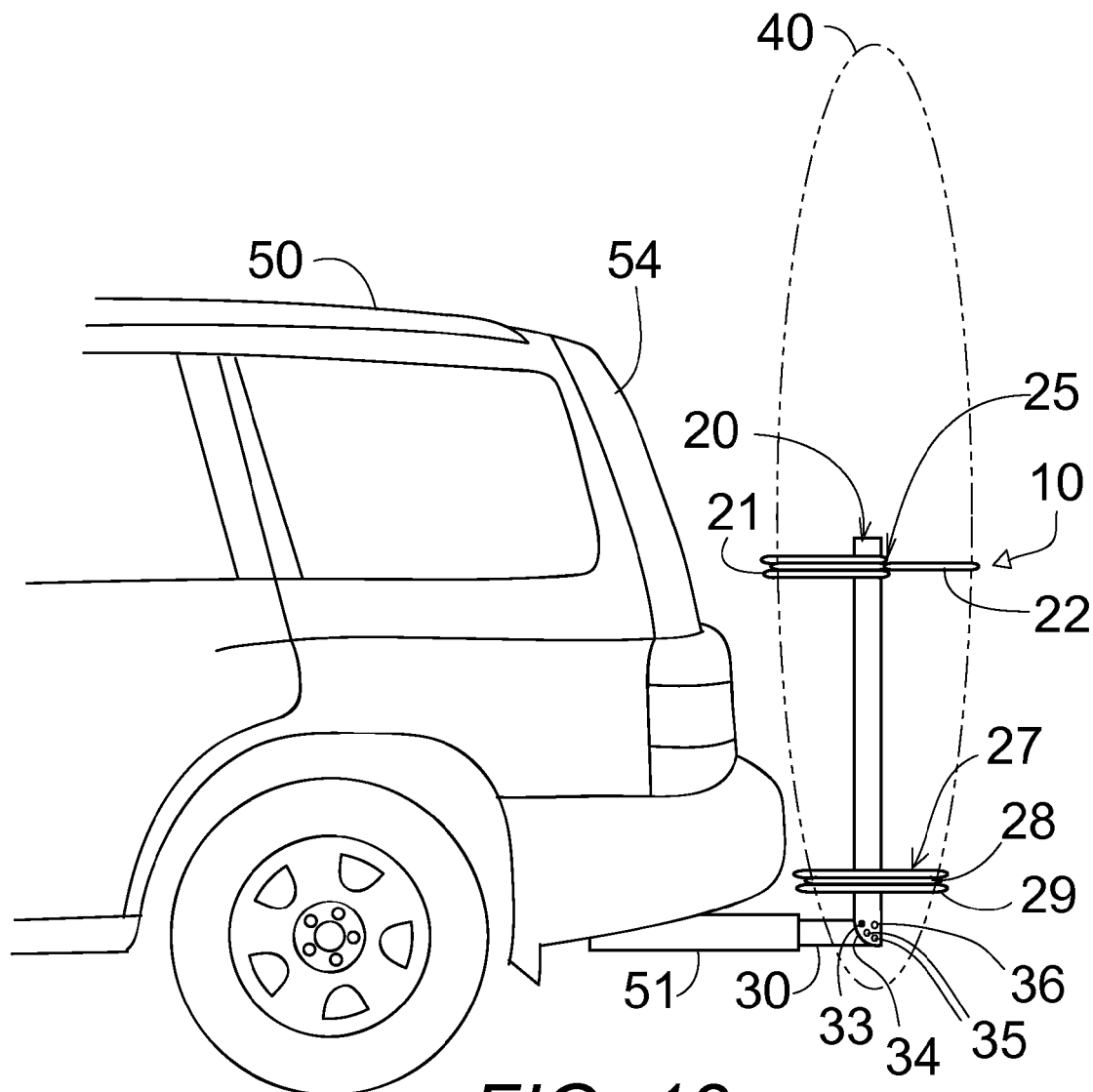
FIG. 13 is a side elevational view of the surfboard carrier device of the present invention having a center post with a pivotally attached trailer hitch insert for removably connecting to a trailer hitch receptacle of a vehicle and a pair of surfboards with each one resting in a bottom receiving ring attached to each side of the center post and an upper portion of the board resting in a retainer loop attached to each side of the top of the center post with an elasticized strap for retaining the board therein.

In FIGS. 13 and 14, the surfboard carrier device 10 of the present invention has a center post 20 with a pivotally attached trailer hitch insert 30 having a pivot plate 34 with an arched series of pin holes 35 to receive a retaining pin 33 through one of the holes so that the center post 20 pivots down away from the back of the vehicle 50 on pivot pin 36 and locks in place to allow a back door 54 of the vehicle to swing open, as shown in FIG. 14. The trailer hitch insert 30 is removably inserted in a trailer hitch receptacle 51 of the vehicle 50. The surfboards 40 rest in a bottom receiving ring 27 having a solid ring 28 and soft padding 29 against the surfboard, and the upper portion of the boards rest in a retainer loop 25 attached to each side of the top of the center post with a padded rigid arc 21 and an elasticized strap 22 for retaining the board therein.

In use, the surfboard rack device 10 of the present invention is mounted on a vehicle 50 either by sliding the trailer hitch insert 30 into the trailer hitch receptacle 51 and locked in by a pin 52, as shown in FIGS. 1-6 or hooking the flat hooks 32A and 32B of the rack support frame 31A and 31B over the top and bottom of the trunk lid 53, as shown in FIGS. 7-12. One end of each of the surfboards 40 is inserted in the bottom receiver ring 27 or lower receiver ring 27A and net basket 19 and the upper portion of the surfboard rested on the top retainer loop 25. When all the surfboards 40 are loaded, the strap hooks 24 are hooked around the surfboards 40 into the strap rings 26 to secure the surfboards 40 for transport on the vehicle 50.

It is understood that the preceding description is given merely by way of illustration and not in limitation of the invention and that various modifications may be made thereto without departing from the spirit of the invention as claimed.

What is claimed is:

1. A surfboard carrier device for vehicles, the device comprising:
   a center post removably attachable to a vehicle, the center post comprising a rigid elongated post for supporting a plurality of surfboards attached thereto and means for attaching the post removably to a vehicle for transporting at least one surfboard attached to the center post;
   a pair of bottom receiver rings attached to a bottom portion of the center post, one of the pair on each of two sides of the center post, each the receiver rings comprising a rigid surfboard encircling structure, covered by a resilient surface covering, to support a bottom portion of at least one surfboard placed within each of the receiver rings, each of the receiver rings further comprising a flexible netting forming a bottom basket attached around a bottom of each of the receiver rings for receiving a bottom of the at least one surfboard resting in the bottom basket;
   a pair of top retainer loops attached to an upper portion of the center post, one of the pair of retainer loops on each of the two sides of the center post above and spaced apart from the pair of receiver rings, each of the retainer loops comprising adjustable means for admitting and securing at least one surfboard within the retainer loop.

2. The device of claim 1 wherein each of the retainer loops comprises a rigid arc portion covered by a resilient surface covering to receive at least one surfboard resting against the arc portion and an elasticized strap attached around the at least one surfboard connecting two sides of the arc portion for retaining the at least one surfboard secured thereto for transport of the at least one surfboard.

3. The device of claim 1 wherein each of the retainer loops comprises a pair of pivotable arc portions covered by a resilient surface cover, the pair of pivotable arc portions attached together at first end by a hinge to allow pivoting therebetween and a removably securing lock at a second end to alternate lock and release at least one surfboard between the pair of pivotable arc portions.

4. The device of claim 1 wherein the means for removably attaching the center post comprises a bottom trailer hitch insert rigidly attached to the center post and extending orthogonally therefrom at a bottom of the center post for inserting the bottom trailer hitch insert into a trailer hitch receiver on a vehicle for transporting the device attached to the vehicle.

5. The device of claim 1 wherein the means for removably attaching the center post comprises a bottom trailer hitch insert pivotally attached to the center post by a pivot pin through a pivot plate so that the center post reversibly pivots down away from the back of the vehicle, the pivot plate having an arched array of pin holes therein to receive a retaining pin through one of the holes to secure the center post alternately in an upright position and a downward position pivoted away from the back of the vehicle.

6. The device of claim 1 wherein the means for removably attaching the center post comprises a support frame rigidly attached to the center post, the support frame comprising a pair of upper vehicle attaching hooks and a pair of lower vehicle attaching hooks for attaching to parts of the vehicle for removably securing the device to the vehicle.

7. The device of claim 6 wherein the hooks are thin flat metal hooks which removably hook under a top edge and a bottom edge of the vehicles trunk lid.

* * * * *